United States Patent [19] [11] 4,169,284
Hogan et al. [45] Sep. 25, 1979

[54] CACHE CONTROL FOR CONCURRENT ACCESS

[75] Inventors: Spurgeon G. Hogan; Carleton E. Werve; Edward C. Wong, all of Poughkeepsie, N.Y.

[73] Assignee: International Business Machines Corporation, Armonk, N.Y.

[21] Appl. No.: 884,301

[22] Filed: Mar. 7, 1978

[51] Int. Cl.² ............................................. G06F 13/00
[52] U.S. Cl. ..................................................... 364/200
[58] Field of Search ... 364/200 MS File, 900 MS File

[56] References Cited

U.S. PATENT DOCUMENTS

| 3,588,829 | 6/1971 | Boland | 364/200 |
|---|---|---|---|
| 3,670,307 | 6/1972 | Arnold | 364/200 |
| 3,670,309 | 6/1972 | Amdahl | 364/200 |
| 3,858,183 | 12/1974 | Amdahl | 364/200 |
| 4,016,541 | 4/1977 | Delagi | 364/200 |
| 4,080,652 | 3/1978 | Cronshaw | 364/200 |

Primary Examiner—James D. Thomas
Attorney, Agent, or Firm—Bernard M. Goldman

[57] ABSTRACT

The disclosure enables concurrent access to a cache by main storage and a processor by means of a cache control which provides two cache access timing cycles during each processor storage request cycle. The cache is accessible to the processor during one of the cache timing cycles and is accessible to main storage during the other cache timing cycle. No alternately accessible modules, buffering, delay, or interruption is provided for main storage line transfers to the cache.

7 Claims, 4 Drawing Figures

CACHE CONTROL FOR CONCURRENT ACCESS

BACKGROUND OF THE INVENTION

1. Field of the Invention

The invention relates to improvements in cache control in a data processing system which enables the processor and main storage to concurrently access the cache at their highest data transfer rates without conflict.

2. Description Of The Prior Art

In the prior art, U.S. Pat. No. 3,705,388 interrupts main storage while it is transferring a line of data to a cache to permit a processor to access a different line of data in the cache. U.S. Pat. Nos. 3,670,307 and 3,670,309 enable concurrent processor and line fetch accesses by accessing different BSM's in the cache; that is, the processor can access the busses of one BSM of a cache concurrently with a line fetch from main storage accessing the different busses of another BSM of the cache, which must be constructed with plural BSM's. U.S. Pat. No. 3,588,829 delays a processor request to the cache from the first word of a line transfer until after the last word of the line fetch is completed from main storage to the cache. U.S. Pat. No. 3,806,888 provides fast readout means in the main memory so that on each line of data can be transferred through a buffer to a cache in the time normally required to transfer a word from main memory. None of these prior patents reveal the concept involved in the subject invention which enables a cache to concurrently be accessed by main storage and a processor at their maximum rates without interferring with each other and without added buffers, and without interrupting either the main storage or processor operations.

SUMMARY OF THE INVENTION

An object of the subject invention is to allow a processor to fetch from a cache while a line of data is being fetched from main storage to the cache due to a processor fetch request.

Another object of the invention is to provide a cache with a maximum access rate which is at least twice the maximum processor request rate, so that processor and main storage accesses to different lines of data in a cache can be made without conflict, delay, additional buffering, or interruption of either the processor access or main storage access operations.

The subject invention eliminates cache interference between processor (i.e. CPU) and main storage accesses of a cache without requiring any buffering or delay for the accesses while main storage is fetching a line (i.e. block) of data to the cache unless the processor is requesting to access the line being fetched. Many processor requests will be to a different line in the cache than the line being transferred from main storage. The invention enables the simultaneous access to the cache by main storage and the processor by providing a cache control that performs two fast cycles during each processor cycle, in which the cache is accessible to the processor during one of the fast cycles and is accessible to the main storage during the other fast cycle.

In the event of a processor request to a line being transferred from main storage, that processor request is held up until the line becomes available in the cache, unless the request bypasses the cache to the processor; the address of the transfer in progress from main storage (stored in a register) is compared with the address of the processor request to determine that they are different. If the addresses are the same, the line transfer is completed from main storage to the cache before that processor access is allowed.

These and other objects, features and advantages of the invention may be more fully understood and appreciated by considering the following detailed description in association with the accompanying drawings.

BRIEF DESCRIPTION OF THE DRAWINGS

In the accompanying drawings forming a material part of this disclosure.

BRIEF DESCRIPTION OF THE PREFERRED EMBODIMENT

Figure 1A:
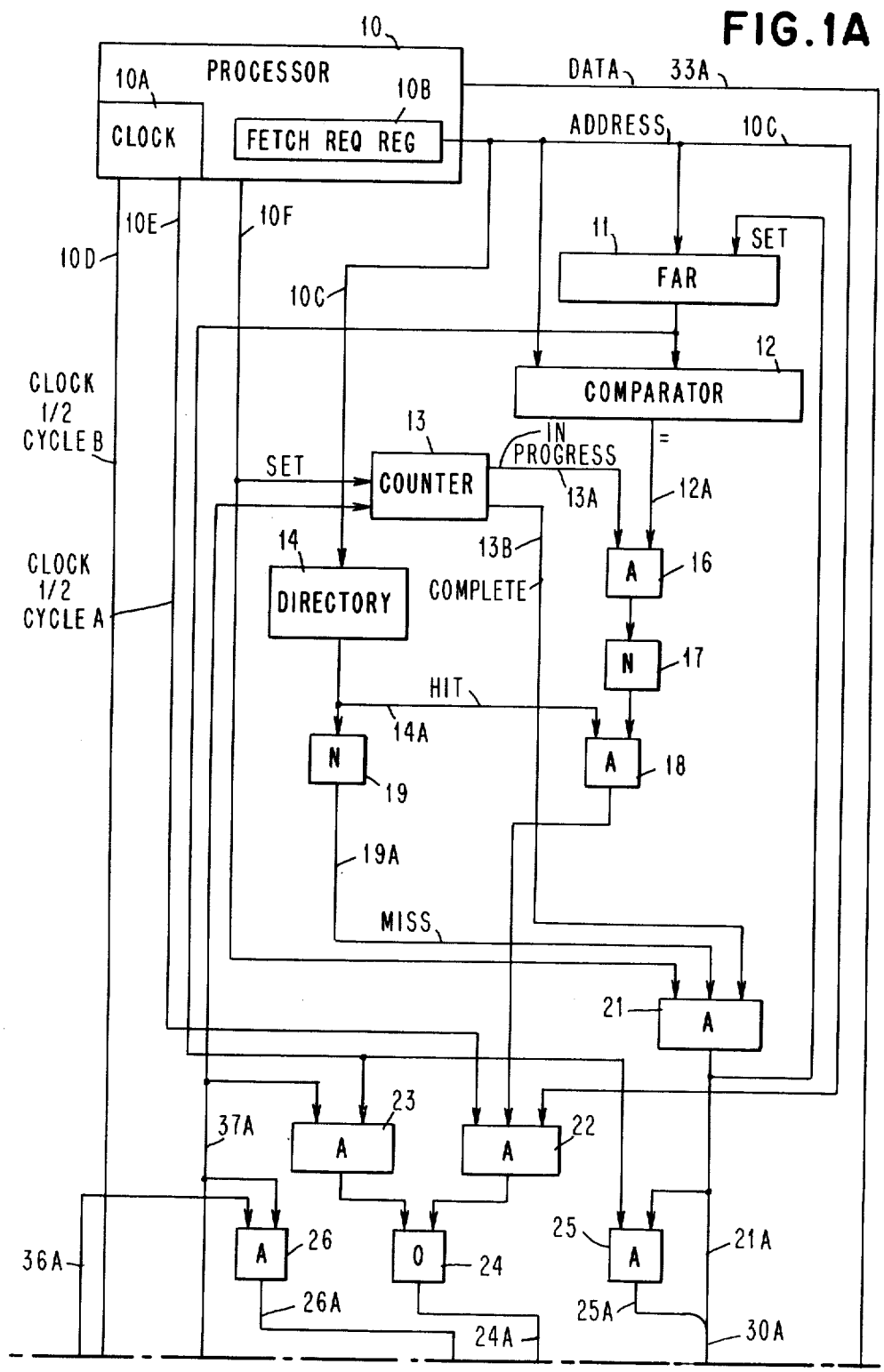
FIGS. 1A and 1B illustrate a block schematic diagram of a preferred embodiment of the invention.
Figure 1B:
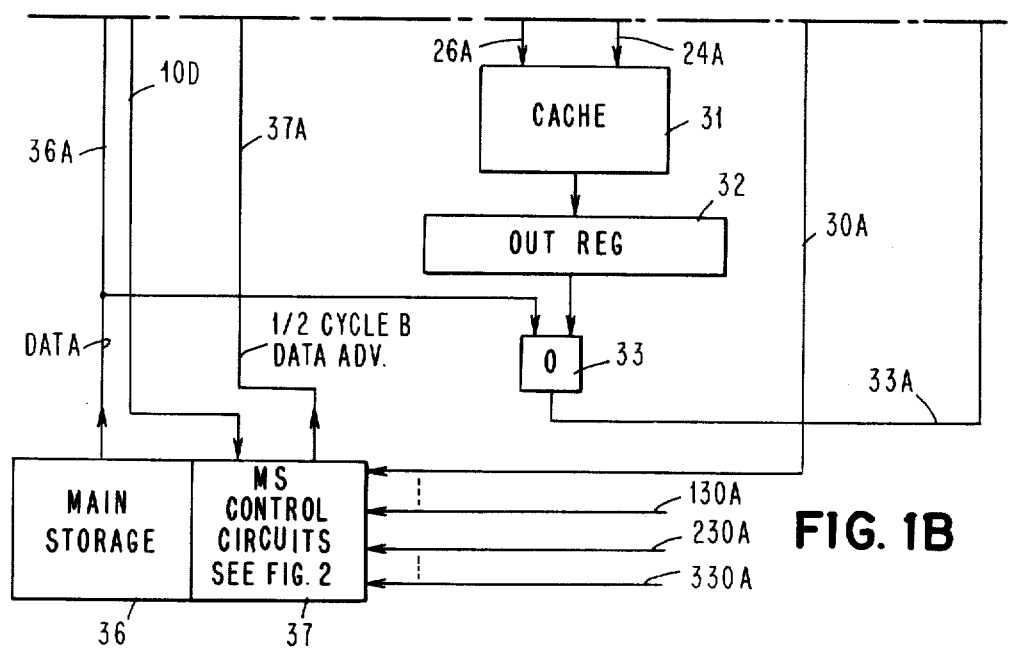

FIGS. 1A and 1B illustrate a preferred mode of practicing the invention. Processor instruction and execution (I/E) functions are represented by box 10. They include a clock 10A which times the processor machine cycles, and a fetch request register 10B which issues fetch requests to storage on a line 10C that transfers the storage address of a request to a fetch address register (FAR) 11 and a cache directory 14. Cache directory 14 is examined to determine if the data requested (corresponding to the request address) is in an associated cache 31. If the data is not represented in cache directory 14 (i.e. a cache miss), a main storage (MS) select signal is generated from AND circuit 21 and provides to MS control 37 to initiate a line fetch from main storage. The line fetch is accessed from main storage as a fixed number of plural parallel groups, each group corresponding to the width of the MS bus 36A. In more detail, address used to fetch data from main storage is placed in FAR 11 to address the requested group of N data groups in the line to be fetched. A counter 13 keeps track of the data groups in the line as they are returned from MS. Counter 13 counts to N. (For example: if each line fetch has four double words and MS bus is 1 double word wide for accessing a double word group, then N=4. Thus, counter 13 is incremented by one each time a doubled word is loaded into a cache from MS.) The counter generates a line fetch complete signal after it has stepped N times, and provides a line fetch in progress signal until it reaches the count of N. Counter 13 is set to zero by a storage request clock cycle on line 10F at the beginning of each line fetch.

The processor requested access is the first data group returned from main storage in the line fetch. This data group is also placed in the cache via AND gate 26, and the directory 14 is updated by conventional means to show a mapping of all valid data in the cache. The remaining data groups in the line fetch are then loaded into the cache as they are returned from main storage. The line fetch may provide a larger amount of data than the processor requested, although the first group contains the requested data.

The cache 31 can be accessed at two times the processor cycle rate. The cache cycle is organized in relation to the processor machine cycle, with the first half cycle (i.e. clock ½ cycle A) used by the cache to time processor requests, and the second half cycle (i.e. clock ½ cycle B) used by the cache to time write data transfers received in a line fetch from MS.

Whenever the processor requests data on line 10C, the cache directory 14 is checked to determine if the data exists in the cache. Simultaneously, a comparison in comparator 12 is made between the new processor request address on line 10C and the address in FAR 11 that holds the last MS request address. If a cache hit occurs and (1) no line fetch is in progress (indicated by no signal on line 13A, or (2) the current fetch request address and the last fetch request address are not equal (indicated by no signal on line 12A), the processor request is immediately granted so that the cache data is provided immediately from the cache to the processor; and any existing main storage block fetch to the cache continues without interruption. In more detail, this is done by AND gate 16 providing a nonactive output for condition (1) and/or (2) to an inverter 17 which then conditions an AND circuit 18. The cache hit signal on line 14A then enables AND circuit 18 which provides an output to condition AND circuit 22 to pass the processor fetch request address received on line 10C during a clock ½ cycle A received on line 10E from the processor clock 10A. The request address passes through OR circuit 24 to address the data in the cache, which provides the data to cache data out register 32, from which it is passed through OR circuit 33 and line 33A to the processor I/E functions 10.

On the other hand, if comparator 12 provides an equal output on line 12A while counter 13 indicates the line fetch is still being transferred to the cache, AND gate 16 is activated, which disables AND gate 18, and it disables AND gate 22. Then the cache read request on line 10C is blocked, and this request cannot be received by the cache until the main storage transfer to the cache has completed.

If there is no cache hit resulting from a fetch request on line 10C, a cache miss signal is provided on line 19A from cache directory 14 which conditions AND gate 21. If no line fetch is in progress which is indicated by a signal on the line fetch complete line 13B at the time of a storage request clock cycle on line 10F is provided, an MS select signal on line 21A enables AND gate 25 to pass the request address in FAR 11 to MS control circuits 37 along with the MS select signal on the MS select bus 30A that includes both lines 21A and 25A.

The data groups of the line fetch are then accessed in main storage 36 by circuits 37 and are outputted on line 36A with gating by the signals on clock ½ cycle B line 10D. Each outputted data group is signalled by a control signal on the ½ cycle B data advance line 37A, which increments counter 13 and gates the data from line 36A through AND gate 26 to the write data input 26A of cache 31 to enter each data group into the cache.

Figure 2:
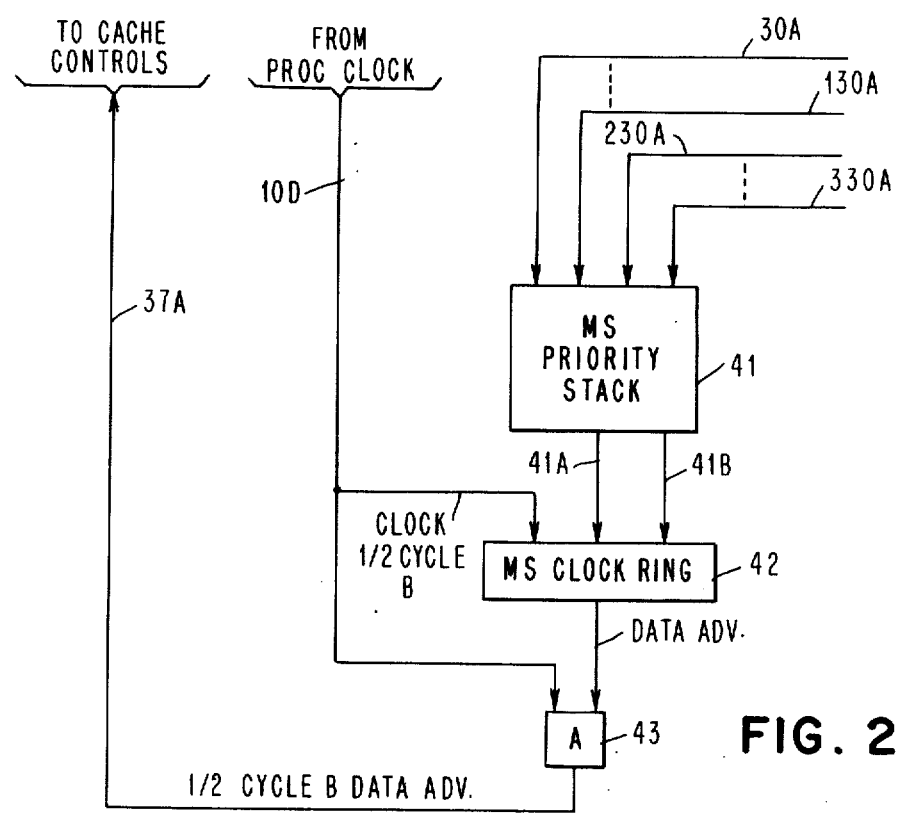
FIG. 2 shows details within the main storage (MS) control circuits block found in FIG. 1.
Figure 3:
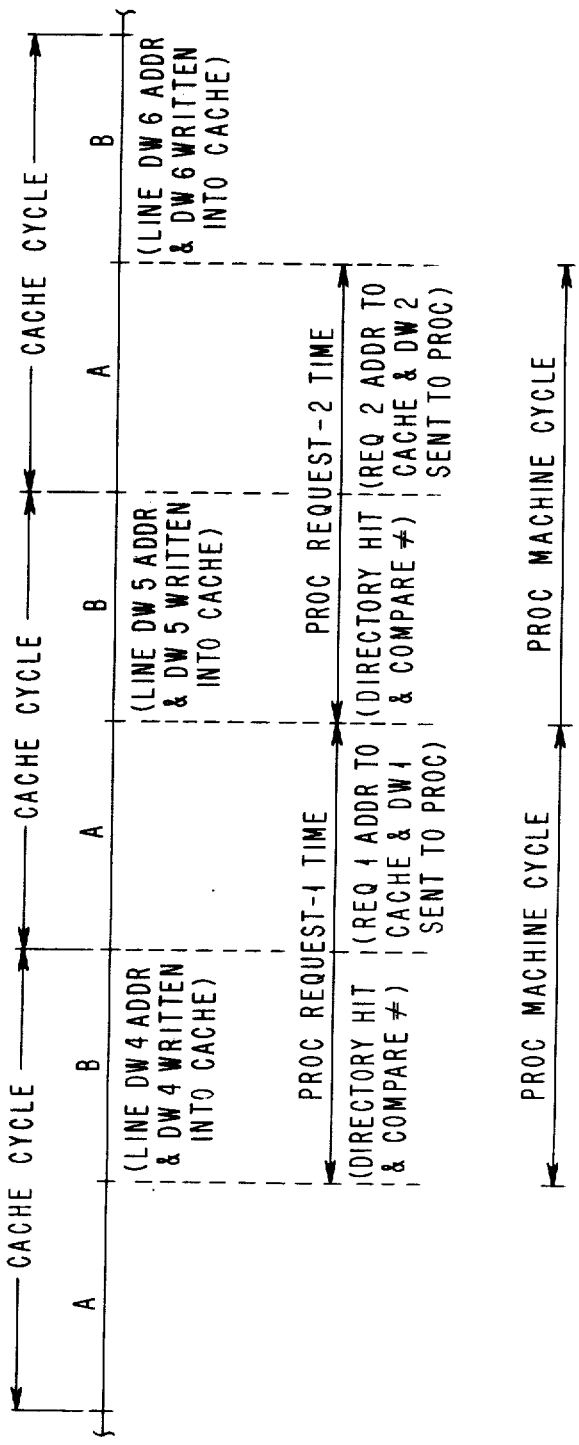
FIG. 3 is a timing diagram illustrating the overlapped timing relationship between processor requests and double words (DWs) in a line being fetched.

FIG. 2 illustrates priority selection and timing circuits in MS control circuits 37 in more detail. A MS priority stack 41 receives the MS select busses 30A through 13A from this processor and from each other processor which can access this MS, and receives MS select busses 230A through 330A from all channels which access this MS. A priority circuit in stack 41 selects a request on one of the MS select inputs when one or more inputs is active with requests, and outputs the selected request on line 41A along with the identifier (ID) of the processor associated with the selected request.

A MS clock ring 42 receives the signals on lines 41A and 41B and is incremented by pulses on clock ½ cycle B line 10D to time out the accessing of the signal groups for the requested line in main storage 36. A data advance output from ring 42 enables an AND gate 43 to pass a pulse from clock ½ cycle B line 10D as the data advance signal on line 37A for each signal group in the accessed line provided to the cache.

While the invention has been particularly described with reference to a preferred embodiment and particular aspects thereof, those skilled in the art will recognize that various changes in form and details may be made therein without departing from the spirit and scope of the invention as indicated in the following claims.

Having thus described our invention, what we claim as new, and desire to secure by Letters Patent is:

1. Means for controlling the overlapping of accessing of a cache during requests to the cache by a processor and by a storage entity transferring a line of data to the cache, each line being divided into a plurality of data groups, the cache having a single addressing means which sequentially receives addresses for all requests to the cache, comprising:

means for timing request addresses to the cache during sub-cycles including: a first cache timing sub-cycle for timing each processor access request address to the addressing means, and a second cache timing sub-cycle for timing the address of each data group in a line being transferred to the cache, directory means operating within a sub-cycle for signalling whether a line of data for the processor request exists in the cache, the directory means indicating when the line does or does not exist in the cache, comparing means for receiving the line address for a line being fetched from the storage entity, the comparing means comparing the line address with each concurrent processor request address, first means for gating each requesting data group address to the cache during a second cache timing sub-cycle, and second means for gating each processor request address to the cache during a first cache timing sub-cycle when the directory indicates the processor request is in the cache and the comparing means indicates the processor request is for a different line in the cache than the line being fetched, whereby the transfer of a line from the storage entity to the cache proceeds without interruption while any concurrent processor request is accessing the cache.

2. Cache access control means as defined in claim 1 further comprising:

means for inhibiting the processor access request until completion of the line transfer when the comparing means indicates the processor access request is to the line being transferred, whereby the line transfer to the cache is allowed to continue without interruption or delay.

3. Cache access control means as defined in claim 2 further comprising:

a first AND gate conditioned by the first cache timing sub-cycle and by the inhibiting means to pass each processor access request to the cache as long as the inhibiting means is not activated, and a second AND gate conditioned in response to the second cache timing cycle to pass each fetch group in each line being transferred from the storage entity to the cache.

4. Cache access control means as defined in claim 2 further comprising:

control circuits for the storage entity for timing the outputting from the storage entity of each fetch group with the second cache timing sub-cycle.

5. Cache access control means as defined in claim 1 further comprising:

clock means in the processor for generating the first cache timing sub-cycle and the second cache timing sub-cycle with different phases relative to a processor machine sub-cycle.

6. A method of overlapping the accessing of a cache by a processor and by a storage entity transferring a line of data between the storage entity and the cache, the line including a plurality of data groups of bits in which each group is handled as a unit of data transfer, a cache address bus connecting the cache to the processor and to the storage entity to receive processor and storage access addresses, comprising the steps of:

requesting a processor access to the cache during a processor machine cycle, providing at least two cache access timing sub-cycles during each processor machine cycle, a first cache timing sub-cycle timing the addressing of the cache by each processor request, a second cache timing sub-cycle timing the addressing of the cache by each data group in the line transfer, determining during the line transfer if a line of data exists in the cache for the processor request, and allowing on said buses on different sub-cycles, the tranfer of an address for a processor request if the determining step finds the line of data in the cache for the processor request, and the transfer of the address for a current data group in a line transfer, whereby a processor access to the cache is allowed during a line transfer to the cache.

7. A method as defined in claim 6 further comprising:

inhibiting the processor access request only if the determining step signals that the complete line of data for the processor request is not in the cache.

* * * * *